(12) United States Patent
Sato

(10) Patent No.: US 9,834,225 B2
(45) Date of Patent: Dec. 5, 2017

(54) HYBRID VEHICLE

(71) Applicant: TOYOTA JIDOSHA KABUSHIKI KAISHA, Toyota-shi, Aichi-ken (JP)

(72) Inventor: Keita Sato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 7 days.

(21) Appl. No.: 15/046,587

(22) Filed: Feb. 18, 2016

(65) Prior Publication Data
US 2016/0244048 A1 Aug. 25, 2016

(30) Foreign Application Priority Data
Feb. 25, 2015 (JP) ................................. 2015-035265

(51) Int. Cl.
| | |
|---|---|
| B60W 50/00 | (2006.01) |
| B60W 50/08 | (2012.01) |
| B60W 50/10 | (2012.01) |
| B60W 10/06 | (2006.01) |
| B60W 10/08 | (2006.01) |
| B60W 30/182 | (2012.01) |

(Continued)

(52) U.S. Cl.
CPC .......... *B60W 50/082* (2013.01); *B60W 10/06* (2013.01); *B60W 10/08* (2013.01); *B60W 20/10* (2013.01); *B60W 20/13* (2016.01); *B60W 30/182* (2013.01); *B60W 50/10* (2013.01); *B60W 2540/04* (2013.01); *B60W 2540/10* (2013.01); *B60W 2710/0666* (2013.01); *B60W 2710/083* (2013.01); *Y02T 10/6269* (2013.01); *Y02T 10/6286* (2013.01)

(58) Field of Classification Search
CPC .... B60W 50/082; B60W 20/13; B60W 10/06; B60W 10/08; B60W 20/10; B60W 30/182; B60W 50/10; B60W 2540/04; B60W 2710/0666; B60W 2710/083
See application file for complete search history.

(56) References Cited

U.S. PATENT DOCUMENTS

| | | | | |
|---|---|---|---|---|
| 6,054,844 A | * | 4/2000 | Frank ....................... | B60K 6/46 180/65.21 |
| 2004/0060751 A1 | * | 4/2004 | Frank ....................... | B60K 6/48 180/65.21 |

(Continued)

FOREIGN PATENT DOCUMENTS

| | | |
|---|---|---|
| JP | 2012-086678 A | 5/2012 |
| JP | 2013-227893 A | 11/2013 |

(Continued)

*Primary Examiner* — Behrang Badii
*Assistant Examiner* — Daniel L Greene
(74) *Attorney, Agent, or Firm* — Finnegan, Henderson, Farabow, Garrett & Dunner, LLP

(57) ABSTRACT

A hybrid vehicle includes an engine, a power storage device, a motor generator that receives electric power from the power storage device to generate travel driving force, and an ECU. The ECU selects one of a CD mode and a CS mode, and switches a traveling mode between EV traveling and HV traveling in accordance with a traveling condition in each of the CD mode and the CS mode. Responsiveness of a vehicle driving torque to an operation of an accelerator pedal is higher in the CD mode than in the CS mode.

5 Claims, 6 Drawing Sheets

(51) Int. Cl.
*B60W 20/10* (2016.01)
*B60W 20/13* (2016.01)

(56) References Cited

U.S. PATENT DOCUMENTS

| | | | |
|---|---|---|---|
| 2009/0044996 A1* | 2/2009 | Frank ................... | B60K 6/48 |
| | | | 180/65.29 |
| 2011/0114403 A1* | 5/2011 | Hauger ................. | B60K 6/387 |
| | | | 180/65.25 |
| 2011/0184600 A1* | 7/2011 | Kristinsson ........ | G01C 21/3469 |
| | | | 701/22 |
| 2013/0166125 A1* | 6/2013 | Yamamoto ........... | B60L 7/14 |
| | | | 701/22 |
| 2013/0179007 A1* | 7/2013 | Dalum ............... | H01M 16/006 |
| | | | 701/2 |
| 2013/0289814 A1 | 10/2013 | Tanaka et al. | |
| 2013/0317682 A1* | 11/2013 | Morisaki ............. | B60K 6/445 |
| | | | 701/22 |
| 2015/0002053 A1 | 1/2015 | Endo et al. | |

FOREIGN PATENT DOCUMENTS

| | | |
|---|---|---|
| JP | 2013-252853 | 12/2013 |
| JP | 2014-054874 A | 3/2014 |
| WO | WO 2013/111258 A1 | 8/2013 |

* cited by examiner

HYBRID VEHICLE

This nonprovisional application is based on Japanese Patent Application No. 2015-035265 filed on Feb. 25, 2015 with the Japan Patent Office the entire contents of which are hereby incorporated by reference.

BACKGROUND OF THE INVENTION

Field of the Invention

The present invention relates to a hybrid vehicle, and particularly to a hybrid vehicle including an internal combustion engine, a power storage device, and an electric motor that receives electric power from the power storage device to generate travel driving force.

Description of the Background Art

Japanese Patent Laying-Open No. 2013-252853 discloses a hybrid vehicle implementing a CD (Charge Depleting) mode and a CS (Charge Sustaining) mode. In the CD mode, EV (Electric Vehicle) traveling is mainly executed while allowing HV (Hybrid Vehicle) traveling, so that an SOC (State Of Charge) of a power storage device is actively consumed. In the CS mode, the SOC is controlled so as to fall within a prescribed range by switching the traveling mode between HV traveling and EV traveling as appropriate. In EV traveling, the vehicle travels using only a motor generator while stopping its engine. In HV traveling, the vehicle travels while operating its engine (see Japanese Patent Laying-Open No. 2013-252853).

Due to recent progress in the power electronics technique, motors, inverters, power storage devices and the like have been improved in performance. Also due to such a technical background, hybrid vehicles have been increased in flexibility in selecting a driving force source (an engine or a motor). Thus, it is desirable for a hybrid vehicle implementing a CD mode and a CS mode to achieve a special traveling performance with a high level of user satisfaction particularly in the CD mode.

In general, the relation between (i) the responsiveness of the vehicle driving torque to the operation of an accelerator pedal and (ii) shock, sound or the like resulting from torque changes (which will be hereinafter comprehensively referred to as "shock") is a trade-off relation. Thus, the responsiveness of the vehicle driving torque is set in accordance with the characteristics required for a vehicle. However, if the responsiveness of the vehicle driving torque is equally set, a special traveling performance with a high level of user satisfaction cannot be achieved in the CD mode.

SUMMARY OF THE INVENTION

The present invention has been made in order to solve the above-described problems. An object of the present invention is to allow a hybrid vehicle implementing a CD mode and a CS mode to achieve a special traveling performance in the CD mode.

According to the present invention, a hybrid vehicle includes: an internal combustion engine; a power storage device; an electric motor that receives electric power from the power storage device to generate travel driving force; and a control device for selecting one of a CD mode and a CS mode. The control device switches a traveling mode between a first traveling mode (EV traveling) and a second traveling mode (HV traveling) in accordance with a traveling condition in each of the CD mode and the CS mode. In the first traveling mode (EV traveling), the vehicle travels by using the electric motor while stopping the internal combustion engine. In the second traveling mode (HV traveling), the vehicle travels while operating the internal combustion engine. Responsiveness of a vehicle driving torque to an operation of an accelerator pedal is higher in the CD mode than in the CS mode.

Generally, the responsiveness of the electric motor is higher than the responsiveness of the internal combustion engine. Also, the required torque responsiveness is different between the CD mode in which EV traveling is mainly executed and the CS mode in which HV traveling and EV traveling are switched as appropriate to control the SOC to fall within a prescribed range. Accordingly, in the present hybrid vehicle, the responsiveness of the vehicle driving torque to the operation of the accelerator pedal is switched between the CD mode and the CS mode. Specifically, the responsiveness of the vehicle driving torque to the operation of the accelerator pedal is higher in the CD mode than in the CS mode. Therefore, according to the present hybrid vehicle, a special traveling performance can be implemented in the CD mode.

Preferably, the responsiveness of the vehicle driving torque when the vehicle travels in the first traveling mode while the CD mode is selected is identical to the responsiveness of the vehicle driving torque when the vehicle travels in the second traveling mode while the CD mode is selected.

By providing such a configuration, even if EV traveling and HV traveling are switched in the CD mode, the responsiveness of the vehicle driving torque does not change. Accordingly, a special traveling performance can be implemented in the CD mode without causing the user to feel strangeness.

Preferably, the control device performs a gradually-changing process for limiting a change rate of the vehicle driving torque. Then, the control device sets the responsiveness of the vehicle driving torque to be higher in the CD mode than in the CS mode by switching between the CD mode and the CS mode a setting for defining a limitation on the change rate of the vehicle driving torque in the gradually-changing process.

Further preferably, the control device performs a gradually-changing process for limiting a change rate of an accelerator pedal position in accordance with the operation of the accelerator pedal. The control device sets the responsiveness of the vehicle driving torque to be higher in the CD mode than in the CS mode by switching, between the CD mode and the CS mode, a setting for defining a limitation on the change rate of the accelerator pedal position in the gradually-changing process.

By providing such a configuration, when the CD mode is selected among the CD mode and the CS mode between which the required responsiveness of the vehicle driving torque is different, the responsiveness of the vehicle driving torque to the operation of the accelerator pedal can be set higher as compared with the case where the CS mode is selected. As a result, a special traveling performance in the CD mode can be implemented.

Preferably, the hybrid vehicle further includes a charging mechanism for charging the power storage device using electric power from a power supply external to the vehicle.

According to the present hybrid vehicle, the fuel efficiency in the CD mode can be improved using electric power supplied from the power supply external to the vehicle while implementing a special traveling performance in the CD mode.

The foregoing and other objects, features, aspects and advantages of the present invention will become more

DESCRIPTION OF THE PREFERRED EMBODIMENTS

Figure 1:
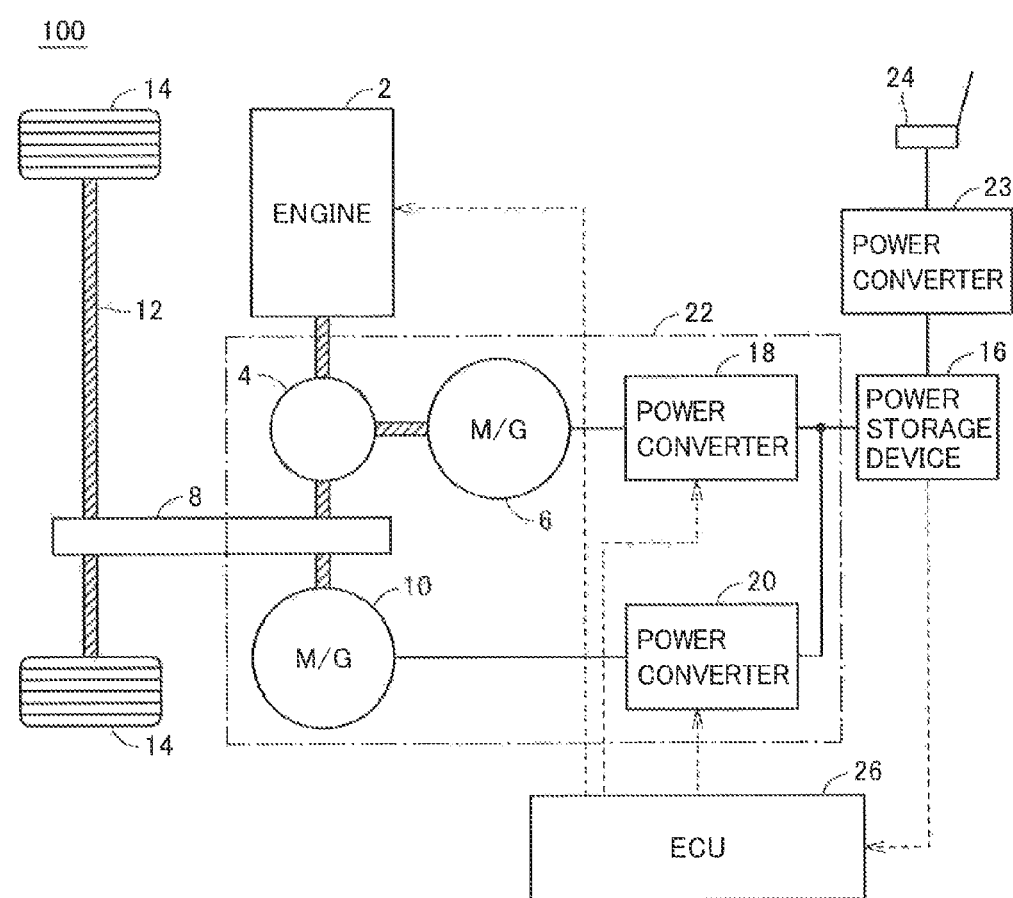
FIG. 1 is a block diagram for illustrating the entire configuration of a hybrid vehicle according to an embodiment of the present invention.

The embodiments of the present invention will be hereinafter described in detail with reference to the accompanying drawings, in which the same or corresponding components are designated by the same reference characters, and description thereof will not be repeated.

FIG. 1 is a block diagram for illustrating the entire configuration of a hybrid vehicle according to an embodiment of the present invention. Referring to FIG. 1, a hybrid vehicle 100 includes an engine 2, a drive device 22, a transmission gear 8, a drive shaft 12, a wheel 14, a power storage device 16, and an ECU (Electronic Control Unit) 26. Furthermore, hybrid vehicle 100 further includes a power converter 23 and a connection unit 24.

Engine 2 is an internal combustion engine that outputs motive power by converting thermal energy produced by combustion of fuel into kinetic energy of a motion element such as a piston and a rotor. Examples of fuel for engine 2 may be suitably hydrocarbon-based fuel such as gasoline, light diesel oil, ethanol, liquid hydrogen and natural gas, or liquid or gaseous hydrogen fuel.

Drive device 22 includes a power split device 4, motor generators 6 and 10, and power converters 18 and 20. Motor generators 6 and 10 each are an alternating-current (AC) rotating electric machine, and, for example, a three-phase AC synchronous motor having a rotor in which a permanent magnet is embedded. Motor generator 6 is used as a power generator driven by engine 2 via power split device 4 and also used as an electric motor for starting engine 2. Motor generator 10 mainly operates as an electric motor and drives drive shaft 12. On the other hand, when a breaking operation is performed or when acceleration is slowed down while the vehicle is traveling downhill, motor generator 10 operates as a power generator to perform regenerative power generation.

Power split device 4 includes a planetary gear mechanism having three rotation shafts including a sun gear, a carrier, and a ring gear, for example. Power split device 4 divides the driving force of engine 2 into motive power transmitted to the rotation shaft of motor generator 6 and motive power transmitted to transmission gear 8. Transmission gear 8 is coupled to drive shaft 12 for driving wheel 14. Furthermore, transmission gear 8 is coupled also to the rotation shaft of motor generator 10.

Power storage device 16 is a rechargeable direct-current (DC) power supply, which is, for example, formed of a secondary battery such as a nickel-metal hydride or lithium-ion secondary battery, a capacitor with large capacity, and the like. Power storage device 16 supplies electric power to power converters 18 and 20. Furthermore, when receiving electric power generated during power generation of motor generator 6 and/or 10, power storage device 16 is charged. Furthermore, power storage device 16 may be charged with electric power supplied through connection unit 24 from a power supply external to the vehicle.

The state of charge of power storage device 16 is shown by an SOC expressed in percentage of the current power storage amount relative to the fully-charged state of power storage device 16. The SOC is calculated, for example, based on the output voltage and/or the input/output current of power storage device 16 that are detected by a voltage sensor and/or a current sensor that are not shown. The SOC may be calculated by an ECU separately provided in power storage device 16, or may be calculated by an ECU 26 based on the detected value of the output voltage and/or the input/output current of power storage device 16.

Based on the control signal received from ECU 26, power converter 18 performs a bidirectional DC/AC power conversion between motor generator 6 and power storage device 16. Similarly, based on the control signal received from ECU 26, power converter 20 performs a bidirectional DC/AC power conversion between motor generator 10 and power storage device 16. Thereby, motor generators 6 and 10 can output a positive torque used for serving as an electric motor or a negative torque used for serving as a power generator, while transmitting and receiving electric power to and from power storage device 16. Power converters 18 and 20 each are formed of an inverter, for example. In addition, a boost converter for a DC voltage conversion can be arranged between power storage device 16 and each of power converters 18 and 20.

Power converter 23 converts, into a voltage level of power storage device 16, the electric power from an external power supply (not shown) located external to the vehicle and electrically connected to connection unit 24. Power converter 23 outputs the converted power to power storage device 16 (charging of power storage device 16 by an external power supply will be hereinafter also referred to as "external charging"). Power converter 23 is configured, for example, to include a rectifier or an inverter. The method of receiving electric power from the external power supply is not limited to a method of receiving electric power using connection unit 24 in a contact manner, but may be a method of receiving electric power from the external power supply in a contactless manner using a power receiving coil and the like in place of connection unit 24.

ECU 26 includes a CPU (Central Processing Unit), a storage device, and an input/output buffer, and the like (each of which is not shown), and controls each device in hybrid vehicle 100. It is to be noted that the above-described control is not limited to processing by software, but can be carried out by dedicated hardware (an electronic circuit).

As main control by ECU 26, ECU 26 calculates a vehicle driving torque (requested value) based on the vehicle speed and the accelerator pedal position in accordance with the operation of the accelerator pedal, and calculates the vehicle driving power (requested value) based on the calculated vehicle driving torque. Then, ECU 26 further calculates the required charge power for power storage device 16 based on the SOC of power storage device 16, and controls engine 2 and drive device 22 so as to generate power obtained by adding required charge power to the vehicle driving power (which will be hereinafter referred to as "vehicle power").

When the vehicle power is relatively small, ECU 26 controls drive device 22 so as to cause the vehicle to travel using only motor generator 10 while stopping engine 2 (EV traveling). When the vehicle power is relatively large, ECU 26 controls engine 2 and drive device 22 so as to cause the vehicle to travel while operating engine 2 (HV traveling).

In this case, ECU 26 controls traveling of the vehicle by selectively applying a CD (Charge Depleting) mode and a CS (Charge Sustaining) mode. In the CD mode, the SOC of power storage device 16 is actively consumed by mainly executing EV traveling while allowing HV traveling. In the CS mode, the SOC is controlled so as to fall within a prescribed range by switching the traveling mode between HV traveling and EV traveling as appropriate.

Figure 2:
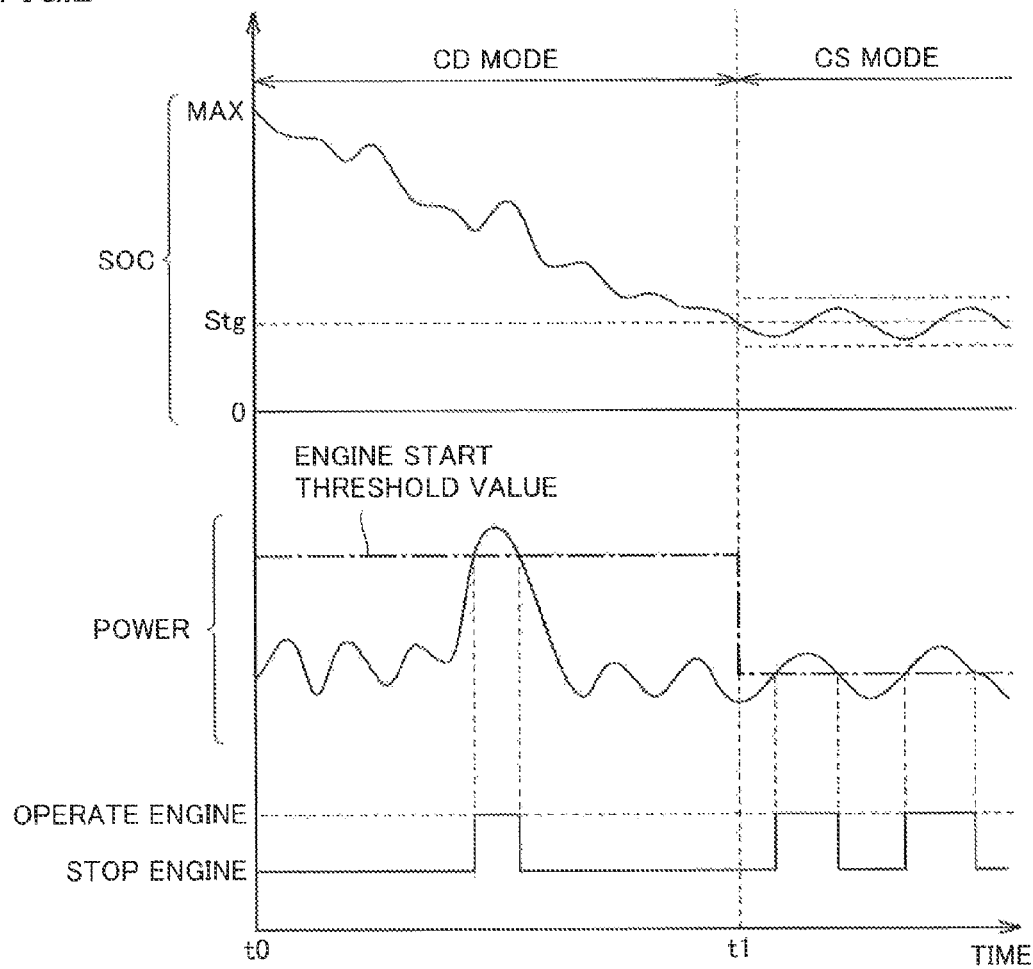
FIG. 2 is a diagram for illustrating a CD mode and a CS mode.

FIG. 2 is a diagram for illustrating the CD mode and the CS mode. Referring to FIG. 2, after power storage device 16 is brought into a fully-charged state (SOC=MAX) by external charging from the external power supply, the vehicle is started to travel in the CD mode.

In the CD mode, the SOC of power storage device 16 is actively consumed, and basically, the electric power stored in power storage device 16 (electric energy mainly by external charging) is consumed. While the vehicle travels in the CD mode, the operation of engine 2 for maintaining the SOC is not carried out. Specifically, the required charge power of power storage device 16 is set at zero, for example, when the CD mode is selected. Thereby, although the SOC increases temporarily by regenerative electric power recovered during deceleration and the like of the vehicle or by the electric power generated by operating engine 2, the proportion of discharging is consequently relatively greater than that of charging. Thus, as a whole, the SOC decreases as the travelling distance increases.

In the CS mode, the SOC of power storage device 16 is controlled so as to fall within a prescribed range. By way of example, at time t1, when the SOC decreases to a prescribed value Stg showing a decrease of the SOC, the CS mode is selected. Then, the subsequent SOC is maintained in a prescribed range. Specifically, engine 2 operates as the SOC decreases (HV traveling), and engine 2 stops as the SOC increases (EV traveling). In other words, in the CS mode, engine 2 operates for maintaining the SOC. Although not particularly shown, a switch that can be operated by the driver is provided, so that the traveling mode can be switched between the CD mode and the CS mode by the driver's intention regardless of the decrease in the SOC.

According to this hybrid vehicle 100, when the vehicle power is smaller than a prescribed engine start threshold value, the vehicle travels by using motor generator 10 while stopping engine 2 (EV traveling). On the other hand, when the vehicle power exceeds the above-described engine start threshold value, the vehicle travels while operating engine 2 (HV traveling). In HV traveling, hybrid vehicle 100 travels using the driving force from engine 2 in addition to the driving force from motor generator 10 or in place of motor generator 10. The electric power generated by motor generator 6 in association with the operation of engine 2 during HV traveling is directly supplied to motor generator 10 or is stored in power storage device 16.

It is preferable that the engine start threshold value in the CD mode is set to be greater than the engine start threshold value in the CS mode. In other words, it is preferable that the region in which hybrid vehicle 100 travels in the EV traveling mode in the CD mode is greater than the region in which hybrid vehicle 100 travels in the EV traveling mode in the CS mode. Thereby, in the CD mode, the frequency that engine 2 is started is suppressed and the opportunity for EV traveling can be further increased as compared with the CS mode. On the other hand, in the CS mode, hybrid vehicle 100 can be controlled to efficiently travel using both of engine 2 and motor generator 10.

Also in the CD mode, engine 2 operates when the vehicle power (equal to the vehicle driving power) exceeds the engine start threshold value. In addition, even if the vehicle power does not exceed the engine start threshold value, the operation of engine 2 may be permitted, for example, during warm-up or the like of engine 2 or an exhaust catalyst. On the other hand, also in the CS mode, engine 2 stops when the SOC increases. In other words, the CD mode is not limited to EV traveling in which the vehicle travels while keeping engine 2 stopped, and the CS mode is also not limited to HV traveling in which the vehicle travels while keeping engine 2 operating. EV traveling and HV traveling each can be carried out both in the CD mode and in the CS mode.

Again referring to FIG. 1, ECU 26 sets the responsiveness of the vehicle driving torque to the operation of the accelerator pedal to be higher in the CD mode than in the CS mode. Thereby, a special traveling performance in the CD mode can be implemented, which will be hereinafter described in detail.

Figure 3:
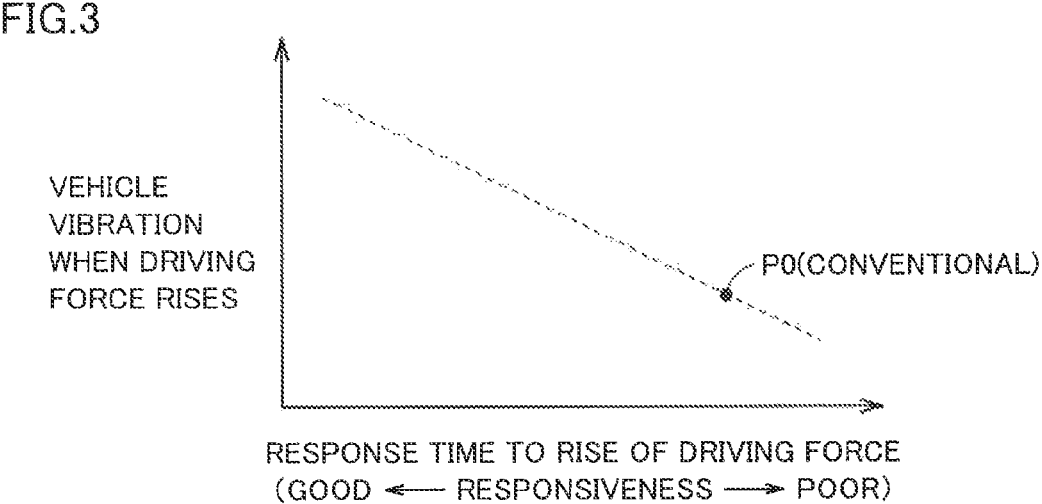
FIG. 3 is a diagram showing a setting of driving force responsiveness in a conventional hybrid vehicle as a comparative example.

FIG. 3 is a diagram showing a setting of the driving force responsiveness in a conventional hybrid vehicle as a comparative example. Referring to FIG. 3, the horizontal axis shows the time period from when the accelerator pedal is pressed until when the driving force (vehicle driving torque) is increased by a prescribed amount, that is, the responsiveness of the vehicle driving torque to the operation of the accelerator pedal. The vertical axis shows the magnitude of vehicle vibration at the time when the driving force is increased by a prescribed amount due to the operation of the accelerator pedal, that is, the magnitude of shock caused by a change in the vehicle driving torque. In addition, shock is caused by tooth hitting and the like resulting from torsion in a drive shaft or a gear system, and backlash in a gear that occur at the time when the vehicle driving torque changes.

The dotted line shows that the responsiveness of the vehicle driving torque to the operation of the accelerator pedal and the magnitude of shock caused by a change in the vehicle driving torque establish a trade-off relation. According to the conventional hybrid vehicle, for example, in order to give a priority to shock reduction, the responsiveness of the vehicle driving torque to the operation of the accelerator pedal is set equally at a point indicated as a point P0 (the point at which the responsiveness is suppressed).

Figure 4:
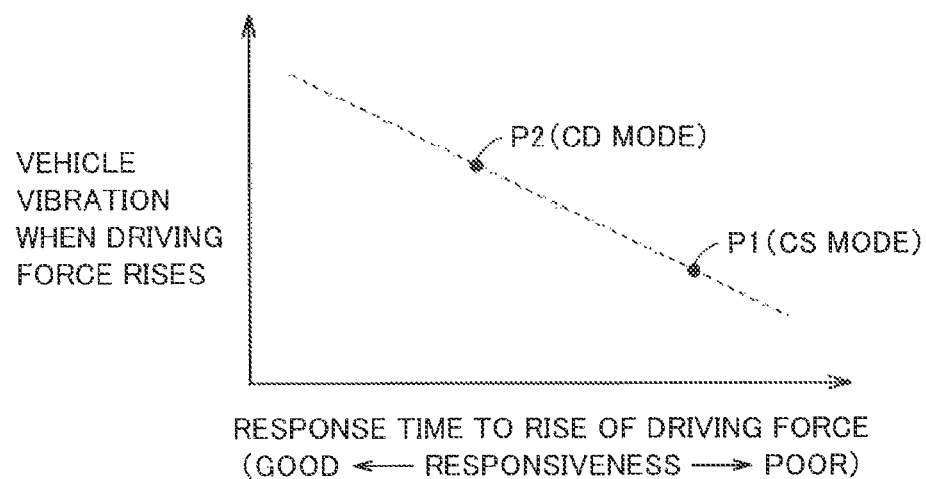
FIG. 4 is a diagram showing a setting of the driving force responsiveness in the hybrid vehicle according to the embodiment.

FIG. 4 is a diagram showing a setting of the driving force responsiveness in hybrid vehicle 100 according to the embodiment of the present invention. This FIG. 4, which corresponds to FIG. 3, shows a horizontal axis and a vertical axis corresponding to those shown in FIG. 3. Referring to FIG. 4, a point P1 shows a setting of the driving force responsiveness when the CS mode is selected, and a point P2 shows a setting of the driving force responsiveness when the CD mode is selected. In other words, in hybrid vehicle 100 according to the present embodiment, the setting of the driving force responsiveness is switched between when the CD mode is selected and when the CS mode is selected. Specifically, the responsiveness of the vehicle driving torque to the operation of the accelerator pedal is higher in the CD mode than in the CS mode.

Generally, the responsiveness of the motor generator is higher than the responsiveness of the engine, and the required torque responsiveness is different between the CD mode in which the vehicle travels mainly in the EV traveling mode and the CS mode in which HV traveling and EV traveling are switched as appropriate to control the SOC to fall within a prescribed range. However, if the responsiveness of the vehicle driving torque is equally set like the conventional hybrid vehicle as shown in FIG. 3, a special traveling performance with a high level of user satisfaction cannot be implemented in the CD mode.

Therefore, in hybrid vehicle 100 according to the present embodiment, as shown in FIG. 4, the setting of the driving three responsiveness is switched between the CD mode and the CS mode. Then, the responsiveness of the vehicle driving torque to the operation of the accelerator pedal is set to be higher in the CD mode than in the CS mode. Thereby, in the CD mode in which the vehicle travels mainly in the EV traveling mode, a special traveling performance can be implemented while sufficiently utilizing high responsiveness of the motor generator. Also, in the CS mode, the responsiveness in accordance with the conventional hybrid vehicle can be set (shock suppression).

Figure 5:
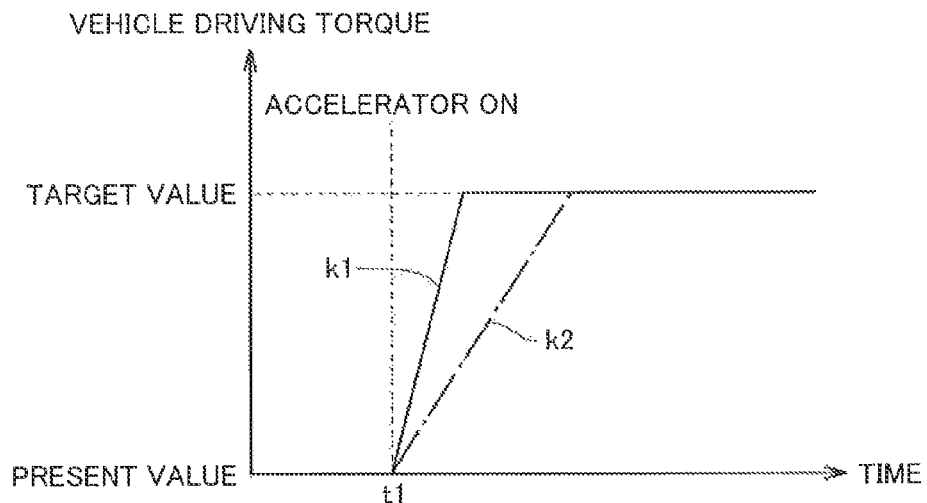
FIG. 5 is a diagram for illustrating a high-low level of the driving force responsiveness.

FIG. 5 is a diagram for illustrating a high-low level of the driving force responsiveness. Referring to FIG. 5, the horizontal axis shows time while the vertical axis shows a vehicle driving torque. At time t1, the accelerator pedal is pressed, and the target value of the vehicle driving torque is changed (increased) according to this pedal pressing.

A line k1 shows a change in the vehicle driving torque when the driving force responsiveness is relatively high, and specifically shows a change in the vehicle driving torque when the CD mode is selected in which the driving force responsiveness as designated by a point P2 in FIG. 4 is set. A line k2 shows a change in the vehicle driving torque when the driving force responsiveness is relatively low, and specifically shows a change in the vehicle driving torque when the CS mode is selected in which the driving force responsiveness as designated by a point P1 in FIG. 4 is set.

In this way, according to this hybrid vehicle 100, the responsiveness of the vehicle driving torque to the operation of the accelerator pedal is set to be higher in the CD mode than in the CS mode, so that a special traveling performance can be implemented in the CD mode.

Again referring to FIG. 1, ECU 26 performs switching of the driving force responsiveness in accordance with mode switching. In other words, ECU 26 performs a gradually-changing process for limiting the change rate of the vehicle driving torque (requested value) calculated based on the vehicle speed and the accelerator pedal position in accordance with the operation of the accelerator pedal. The responsiveness of the vehicle driving torque is determined by this gradually-changing process. Then, ECU 26 switches, between the CD mode and the CS mode, a setting for defining a limitation on the change rate of the vehicle driving torque in the above-described gradually-changing process, thereby setting the responsiveness of the vehicle driving torque to be higher in the CD mode than in the CS mode.

The gradually-changing process is, for example, a rating process for limiting the change rate of the vehicle driving torque, and a "filtering" process for performing a delaying process by a delay filter or the like. Then, ECU 26 switches the responsiveness of the vehicle driving torque between the CD mode and the CS mode for example by switching, in accordance with the mode, the limit value of the change rate of the vehicle driving torque in the above-described rating process or the time constant in the above-described filtering process.

Figure 6:
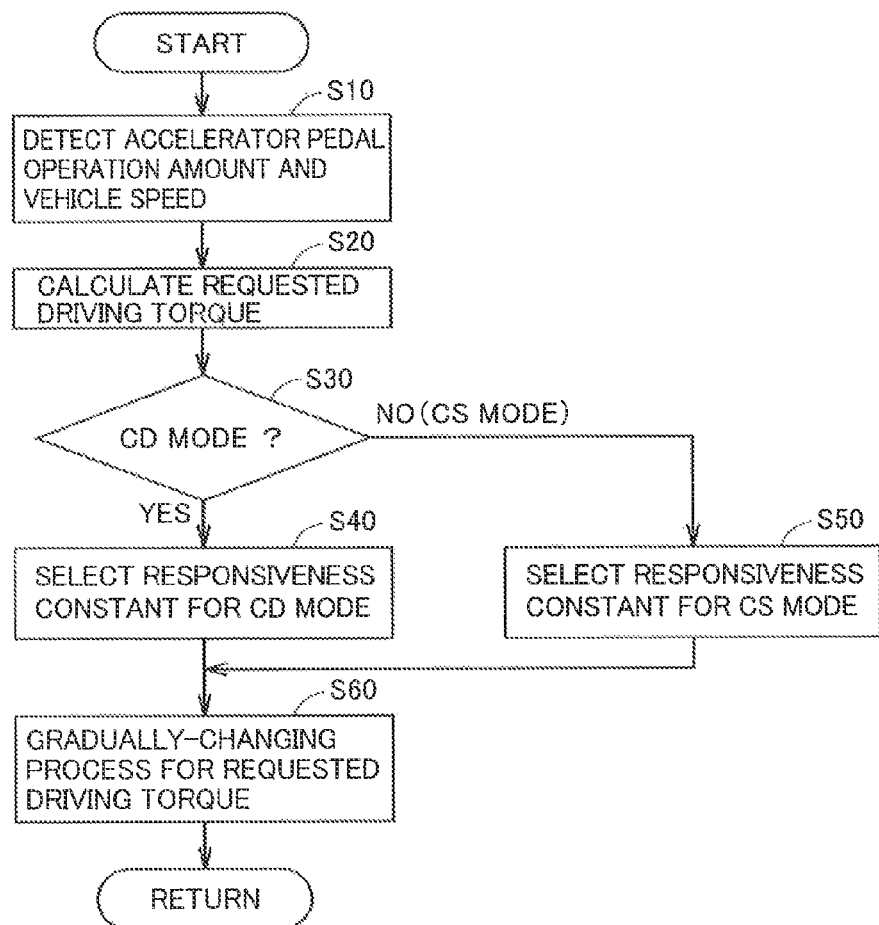
FIG. 6 is a flowchart for illustrating a process of computing a vehicle driving torque (requested value), which is performed by an ECU.

FIG. 6 is a flowchart for illustrating a process of computing the vehicle driving torque (requested value), which is performed by ECU 26 shown in FIG. 1. The process shown in this flowchart is performed as it is called from a main routine and executed at regular intervals or every time predetermined conditions are satisfied.

Referring to FIG. 6, ECU 26 receives detected values of the operation amount of the accelerator pedal and the vehicle speed (step S10). It is to be noted that the operation amount of the accelerator pedal is detected by an accelerator position sensor not shown), and the vehicle speed is detected, for example, by a vehicle speed sensor detecting a vehicle speed by detecting the rotation speed of the axle shaft.

Then, ECU 26 calculates the requested driving torque (requested value of the vehicle driving torque) of the vehicle based on the accelerator pedal operation amount and the vehicle speed that have been detected (step S20). It is to be noted that the requested driving torque can be calculated based on the detected accelerator pedal operation amount and vehicle speed, by using a map and the like defining the relation among the accelerator pedal position in accordance with the accelerator pedal operation amount, the vehicle speed and the vehicle driving torque.

Then, ECU 26 determines whether the CD mode is selected or not (step S30). In this case, it may be determined whether the CS mode is selected or not. Then, when it is determined in step S30 that the CD mode is selected (YES in step S30), ECU 26 selects the responsiveness constant for the CD mode as a responsiveness constant used in the gradually-changing process the requested driving torque, which is performed in step S60 described below (step S40).

On the other hand, when it is determined in step S30 that the CS mode is selected (NO in step S30), ECU 26 selects the responsiveness constant for the CS mode as a responsiveness constant used in the gradually-changing process the requested driving torque, which is performed in step S60 (step S50). In addition, the responsiveness constant for each of the CD mode and the CS mode is set such that the responsiveness of the requested driving torque is higher in the CD mode than in the CS mode.

Then, ECU 26 uses the responsiveness constant selected in step S40 or S50 to perform the gradually-changing process for limiting the change rate of the requested driving torque (step S60). This gradually-changing process is, for example, a rating process for limiting the change rate of the vehicle driving torque, and a "filtering" process for performing a delaying process by a delay filter or the like. In the case where the gradually-changing process is a rating process as described above, the responsiveness constant is, for example, a limit value of the change rate of the requested driving torque, and the change rate limit value for the CD mode is set at a value greater than the change rate limit value for the CS mode (permitting a relatively large change rate). In the case where the gradually-changing process is a "filtering" process, the responsiveness constant is, for example, a time constant of the delay filter, and the time constant for the CD mode is set at a value smaller than the time constant for the CS mode. By such a gradually-changing process, the responsiveness of the requested driving torque (vehicle driving torque) to the operation of the accelerator pedal is determined.

In addition, while the responsiveness constant for the CD mode is selected in step S40, this responsiveness constant is not distinguished between EV traveling and HV traveling. In other words, the responsiveness of the vehicle driving torque in EV traveling while the CD mode is selected is equivalent to the responsiveness of the vehicle driving torque in HV traveling while the CD mode is selected. Thereby, the responsiveness of the vehicle driving torque does not change even if EV traveling and HV traveling are switched in the CD mode. Accordingly, a special traveling performance in the CD mode can be implemented without causing the user to feel strangeness.

As described above, in the present embodiment, the responsiveness of the vehicle driving torque to the operation of the accelerator pedal is switched between when the CD mode is selected and when the CS mode is selected. Specifically, the responsiveness of the vehicle driving torque to the operation of the accelerator pedal is higher in the CD mode than in the CS mode. Therefore, according to the present embodiment, a special traveling performance with a high level of user satisfaction in the CD mode can be provided.

Modification

In the above-described embodiment, a gradually-changing process is carried out for the requested driving torque calculated based on the accelerator pedal operation amount and the vehicle speed, and the responsiveness constant used in the gradually-changing process is to be switched in accordance with the mode. However, the means for switching the responsiveness of the vehicle driving torque is not limited to the above. For example, the gradually-changing process may be carried out for the accelerator pedal position that is calculated based on the accelerator pedal operation amount and used for calculating the requested driving torque, and then, the responsiveness constant used in this gradually-changing process may be switched in accordance with the mode.

Figure 7:
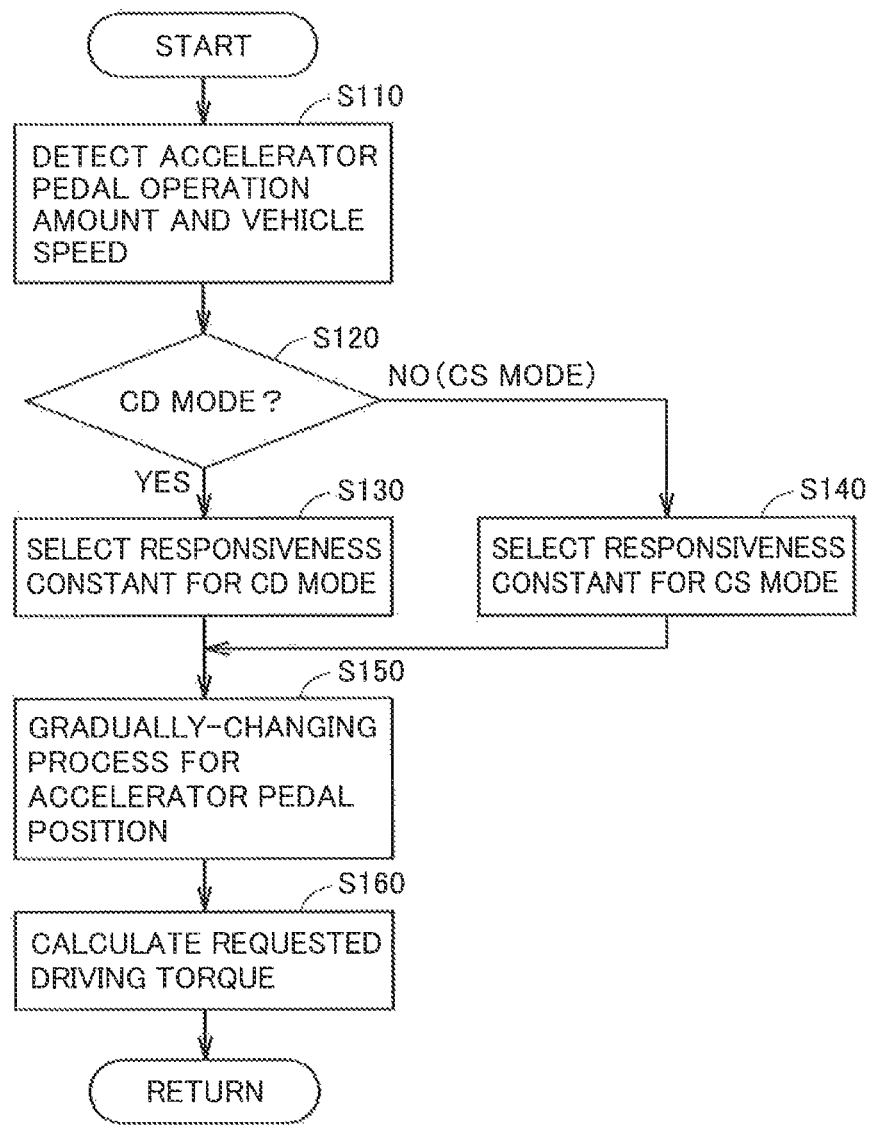
FIG. 7 is a flowchart for illustrating a process of computing the vehicle driving torque (requested value), which is performed by an ECU in a modification.

FIG. 7 is a flowchart for illustrating a process of computing the vehicle driving torque (requested value), which is performed by an ECU in a modification. The process shown in this flowchart is also performed as it is called from a main routine and executed at regular intervals or every time predetermined conditions are satisfied.

Referring to FIG. 7, ECU 26 receives the detected values of the accelerator pedal operation amount and the vehicle speed (step S110). Then, ECU 26 determines whether the CD mode is selected or not (step S120). Also in this case, it may be determined whether the CS mode is selected or not. Then, when it is determined in step S120 that the CD mode is selected (YES in step S120), ECU 26 selects the responsiveness constant for the CD mode as a responsiveness constant used in the gradually-changing process the accelerator pedal position, which is performed in step S150 described below (step S130).

On the other hand, when it is determined in step S120 that the CS mode is selected (NO in step S120), ECU 26 selects the responsiveness constant for the CS mode as a responsiveness constant used in the gradually-changing process the accelerator pedal position, which is performed in step S150 (step S140). It is to be noted that the responsiveness constant for each of the CD mode and the CS mode is set such that the responsiveness of the accelerator pedal position is higher in the CD mode than in the CS mode.

Then, ECU 26 performs a gradually-changing process for limiting the change rate of the accelerator pedal position using the responsiveness constant selected in step S130 or step S140 (step S150). This gradually-changing process is also, for example, a rating process for limiting the change rate of the accelerator pedal position, and a "filtering" process for performing a delaying process by a delay filter or the like. In the case where the gradually-changing process is a rating process as described above, the responsiveness constant is for example a limit value of the change rate of the accelerator pedal position, and the change rate limit value for the CD mode is set at a value larger than the change rate limit value for the CS mode (permitting a relatively large change rate). In the case where the gradually-changing process is a "filtering" process, the responsiveness constant is for example a time constant of the delay filter, and the time constant for the CD mode is set at a value smaller than the time constant for the CS mode. By such a gradually-changing process, the responsiveness of the accelerator pedal position to the operation of the accelerator pedal is determined, with the result that the responsiveness of the vehicle driving torque is determined.

Then, ECU 26 calculates the requested driving torque of the vehicle based on the accelerator pedal position subjected to the gradually-changing process in step S150 and the vehicle speed detected in step S110 (step S160). As described above, the requested driving torque can be calculated based on the calculated accelerator pedal position and the detected vehicle speed, by using a map and the like defining the relation among the accelerator pedal position, the vehicle speed and the vehicle driving torque.

Although not particularly shown, the torque command value of motor generator 10 and the torque command value of engine 2 are subjected to the gradually-changing process for limiting the change rate of each command value, and then, the setting for defining the limitation on the change rate of the command value in the gradually-changing process is switched between the CD mode and the CS mode. Thereby, the responsiveness of the vehicle driving torque may be set to be higher in the CD mode than in the CS mode.

As described above, the same effects as those in the above-described embodiments can be obtained also by this modification. In the above-described embodiment and its modification, an explanation has been given with regard to the control in hybrid vehicle 100 (FIG. 1) having a configuration in which engine 2 and two motor generators 6 and 10 are coupled by power split device 4. However, the hybrid vehicle to which the present invention is applied is not limited to such a configuration.

Figure 8:
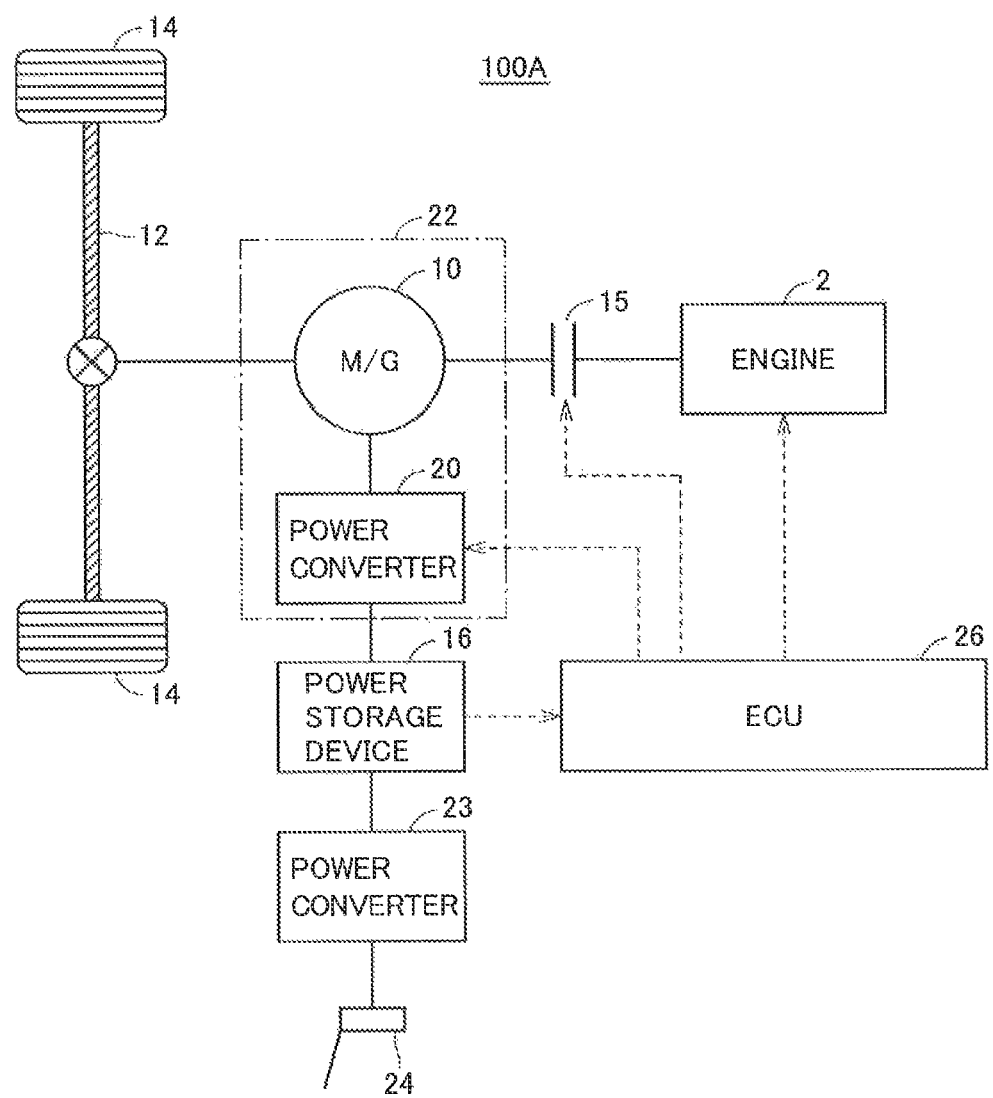
FIG. 8 is a block diagram illustrating a modification of the entire configuration of the hybrid vehicle.

For example, the control having been described in the above-described embodiment can be applicable also to a hybrid vehicle 100A having a configuration in which engine 2 and one motor generator 10 are coupled in series via a clutch 15, as shown in FIG. 8.

Furthermore, although not particularly shown, the present invention is applicable also to the so-called series type hybrid vehicle that uses engine 2 only for driving motor generator 6 and generates vehicle driving force only by motor generator 10.

Furthermore, although hybrid vehicle 100 (1000 has been described in the above-described embodiments as a hybrid vehicle including power storage device 16 that is externally chargeable by an external power supply, the present invention is applicable also to a hybrid vehicle that does not have an external charging mechanism (power converter 23 and connection unit 24). The CD mode/CS mode is suitable for an externally-chargeable hybrid vehicle, but is not necessarily limited only to such an externally-chargeable hybrid vehicle.

In the above description, engine 2 corresponds to one embodiment of the "internal combustion engine" in the present invention, and motor generator 10 corresponds to one embodiments of the "electric motor" in the present invention. Furthermore, ECU 26 corresponds to one embodiment of the "control device" in the present invention, and power converter 23 and connection unit 24 form one embodiment of the "charging mechanism" in the present invention.

Although the embodiments of the present invention have been described, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A hybrid vehicle comprising:
    an internal combustion engine;
    a power storage device;
    an electric motor configured to receive electric power from the power storage device to generate travel driving force; and
    a control device configured to select one of a CD (Charge Depleting) mode and a CS (Charge Sustaining) mode, and to switch a traveling mode between a first traveling mode and a second traveling mode in accordance with a traveling condition in each of the CD mode and the CS mode so as to cause the vehicle to travel, in the first traveling mode, the vehicle traveling by using the electric motor while stopping the internal combustion engine, and in the second traveling mode, the vehicle traveling while operating the internal combustion engine,
    wherein the control device is configured to select a responsiveness constant that is higher in the CD mode than in the CS mode, such that responsiveness of a vehicle driving torque to an operation of an accelerator pedal is higher in the CD mode than in the CS mode.

2. The hybrid vehicle according to claim 1, wherein the responsiveness when the vehicle travels in the first traveling mode while the CD mode is selected is identical to the responsiveness when the vehicle travels in the second traveling mode while the CD mode is selected.

3. The hybrid vehicle according to claim 1, wherein the control device
    performs a gradually-changing process for limiting a change rate of the vehicle driving torque, and
    sets the responsiveness to be higher in the CD mode than in the CS mode by switching, between the CD mode and the CS mode, a setting for defining a limitation on the change rate in the gradually-changing process.

4. The hybrid vehicle according to claim 1, wherein the control device
    performs a gradually-changing process for limiting a change rate of an accelerator pedal position in accordance with the operation of the accelerator pedal, and
    sets the responsiveness to be higher in the CD mode than in the CS mode by switching between, the CD mode and the CS mode, a setting for defining a limitation on the change rate in the gradually-changing process.

5. The hybrid vehicle according to claim 1, further comprising a charging mechanism configured to charge the power storage device using electric power from a power supply external to the vehicle.

* * * * *